(12) United States Patent
Schäfer

(10) Patent No.: US 6,183,317 B1
(45) Date of Patent: Feb. 6, 2001

(54) SHIP DRIVE WITH A DRIVE ENGINE AND DIRECTLY DRIVEN PROPELLER SHAFT

(75) Inventor: Wilhelm Schäfer, Witten (DE)

(73) Assignee: A. Friedr. Flender AG, Bocholt (DE)

( * ) Notice: Under 35 U.S.C. 154(b), the term of this patent shall be extended for 0 days.

(21) Appl. No.: 09/405,701

(22) Filed: Sep. 24, 1999

Related U.S. Application Data

(63) Continuation-in-part of application No. 09/108,354, filed on Jul. 1, 1998, now Pat. No. 6,050,865.

(30) Foreign Application Priority Data

Jul. 3, 1997 (DE) .............................................. 197 29 046
Oct. 16, 1998 (DE) .............................................. 198 47 771

(51) Int. Cl.[7] .................................................... B60L 11/02
(52) U.S. Cl. .................................................. 440/6; 440/75
(58) Field of Search ................................ 440/49, 6, 7, 75

(56) References Cited

U.S. PATENT DOCUMENTS

| | | | |
|---|---|---|---|
| 4,305,710 | * 12/1981 | Schneider | 440/75 |
| 4,368,048 | * 1/1983 | Wedler | 440/75 |
| 5,171,176 | * 12/1992 | Gebhardt et al. | 440/75 |

\* cited by examiner

Primary Examiner—Stephen Avila

(74) Attorney, Agent, or Firm—Max Fogiel

(57) ABSTRACT

There is indicated a ship drive consisting of a drive engine and a propeller shaft which is directly connected therewith and provided with a propeller and the thrust of which is taken up by a thrust bearing. In addition, there is provided an auxiliary drive consisting of an electric engine which is to operate selectably as a generator or a motor and which is connected with a transmission by way of a clutch. In that case a gearwheel of the transmission surrounds the propeller intermediate shaft and is connected therewith by way of a flexible coupling. A play-free, releasable and mechanically positive connection is arranged between transmission and the drive engine, which has a flange at the drive side, on a thrust shaft and is combined with an auxiliary thrust bearing, which has forward and reverse pressure blocks and which is activatable in the case of auxiliary or emergency operation of the ship. In that case, the correspondingly reduced propeller thrust is introduced by way of the auxiliary thrust bearing to a thrust bearing, which is arranged in the drive engine, into the ship hull. A rotationally stiff, but axially pliant diaphragm coupling (4) connected with the propeller shaft (22) and the auxiliary thrust bearing forms the play-free, mechanically positive connection and in normal operation the auxiliary thrust bearing is clamped by means of the pressure blocks (7, 8) against the flanges (1, 13) of the drive side and the thrust shaft (2). For quick release of the cone pins (53) arranged in the flange holes of the flanges (51, 52) of the diaphragm coupling a guide device (60, 61, 62, 63, 64, 65) is mounted, wherein the pins (53) after release of the nuts (54) are journalled to be radially and axially movable in the guide device (FIG. 2).

8 Claims, 2 Drawing Sheets

SHIP DRIVE WITH A DRIVE ENGINE AND DIRECTLY DRIVEN PROPELLER SHAFT

The present application is a continuation-in-part of the parent application Ser. No. 09/108,354, filed Jul. 1, 1998, now U.S. Pat. No. 6,050,865.

BACKGROUND OF THE INVENTION

The invention relates to a ship drive with a drive engine and directly driven propeller shaft.

A ship drive according to the category is known from DE 196 23 914 A1. This ship drive consists of a drive engine and propeller shaft which is directly connected therewith and provided with a propeller and the thrust of which is taken up by a thrust bearing. For auxiliary and emergency operation the known ship drive has a supplementary drive consisting of an electric engine which is to be operated selectably as a generator or a motor and which is connected with a transmission by way of a clutch. A gearwheel of the transmission surrounds the propeller shaft, which is connected with the gearwheel by way of a flexible coupling. Arranged between transmission and drive engine and on a separate section of the propeller intermediate shaft is a play-free switchable coupling, which is combined with a play-free auxiliary thrust bearing transmitting the propeller thrust. In the case of auxiliary or emergency operation of the ship, this auxiliary thrust bearing is activated, wherein the correspondingly reduced propeller thrust is introduced by way of the auxiliary thrust bearing to a thrust bearing arranged in the drive engine and thus into the ship hull.

One of the significant simplifications in the case of the ship drive according to German patent P 197 29 046.9 consists in replacing, in advantageous manner, the expensive switchable clutch by a rotationally stiff, but axially pliant diaphragm coupling. In that case, the diaphragm coupling is clamped in by one element between a flange of the propeller intermediate shaft and an opposite flange of the thrust shaft. The other element of the diaphragm coupling is fastened to the support collar of the auxiliary thrust bearing. The two elements of the diaphragm coupling are held together by way of cone screw bolts which are arranged to be distributed at the circumference and which are supported in a ring. In normal operation the pressure blocks of the auxiliary thrust bearing are tightened against the flanges of the drive side and the propeller intermediate shaft, so that the full propeller thrust is transmitted by way of this bearing statically into the thrust bearing of the drive engine and can thus be introduced into the ship hull. The diaphragm coupling takes over the torque transmission. The tightening of the pressure blocks is effected by a threaded ring, which at the rear side of the flange of the thrust shaft is arranged thereon and supported against the inwardly disposed surface of a support collar formed in bell shape. The support collar is in turn fixedly connected with the flange at the drive side and journalled on the thrust shaft. In order to be able to actuate the threaded ring, cutouts, which extend through the wall, are provided in the circumferential region of the support collar.

In the case of auxiliary and emergency operation of the ship the screw bolts are withdrawn from the diaphragm coupling, so that a direct connection between propeller intermediate shaft and thrust shaft and thus the drive side no longer exists. According to whether in the case of emergency operation a forward travel or a reverse travel is concerned, the corresponding pressure blocks of the auxiliary thrust bearing come into contact. This contact enables the transmission of the reduced propeller thrust to the thrust bearing arranged in the drive engine. According to the respective level of power to be transmitted in the emergency operation, a pressure oil lubrication is required, or a filling up of the bearing is sufficient. In the former case the appropriate components have channels so that the supplied oil can pass into the region of the pressure blocks and conduct away friction heat from there. In the case of lower power the heat radiation extends over the casing. So that the threaded ring cannot unintentionally rotate in the switched-in setting or the switched-out setting, it is secured by appropriate means, for example pins, wire snaps. Switched-out setting signifies in that case a previous rotation of the threaded ring so that the clamping is cancelled and the pressure blocks have the required play.

A specific disadvantage with this ship drive consists in that a comparatively long time is needed for a switching-in and switching-out of the coupling, which is no longer indulged in by cost-conscious shipping companies.

SUMMARY OF THE INVENTION

It is the task of the invention to so design the ship drive according to German patent 197 29 046.9 that a device is created which enables the coupling to be quickly switched in and switched out, so that the economic viewpoints with respect to the uncoupling of the Diesel engine from the propeller drive are adequately taken into consideration.

One of the significant constructional refinements in the ship drive according to the invention consists in that for a switchable diaphragm coupling a releasable connection is indicated, which enables a quick switching-in and switching out of the coupling. For that purpose the releasable connection provided with pins is equipped with a special guide device for release of the pins arranged in flange holes of the flange of the coupling, wherein the pins after release of the nuts are mounted to be radially and axially movable in the guide device.

As further advantage of the ship drive according to the invention is to be mentioned that the guide device of the releasable connection is preferably composed of a guide flange, a known switching fork, a guide bearing, abutment pins, O rings and plate springs, wherein the abutment pins are mounted at the cone pins and are in turn mounted by way of the O rings in flange holes of the flange. In a special form of embodiment the abutment pins are screwed into the pins. In another form of embodiment the abutment pins are welded in the pins. Moreover, the guide flange is arranged on the guide bearing to be axially movable and stands in engagement with the known switching fork. Furthermore, it is advantageous that the conicity of the pins lies beyond the self-locking limit. It has emerged as particularly advantageous in the created releasable connection that the guide device stands in non-interchangeable engagement with the characteristic flange holes of the flanges. Beyond that, it is of particular advantage that on switching-out of the coupling the diaphragm packet does not have to be released but remains firmly screw-connected, so that the diaphragm packet does not come apart. The advantageous construction of the releasable connection is particularly suitable for a quick switching-in and switching out of the coupling, which therefore acts very advantageously in terms of time and thus also in terms of cost.

BRIEF DESCRIPTION OF THE DRAWINGS

The ship drive constructed in accordance with the invention and the special release connection for the coupling is more closely explained in the drawing by reference to an example of embodiment. There.

DESCRIPTION OF THE PREFERRED EMBODIMENTS

Figure 1:
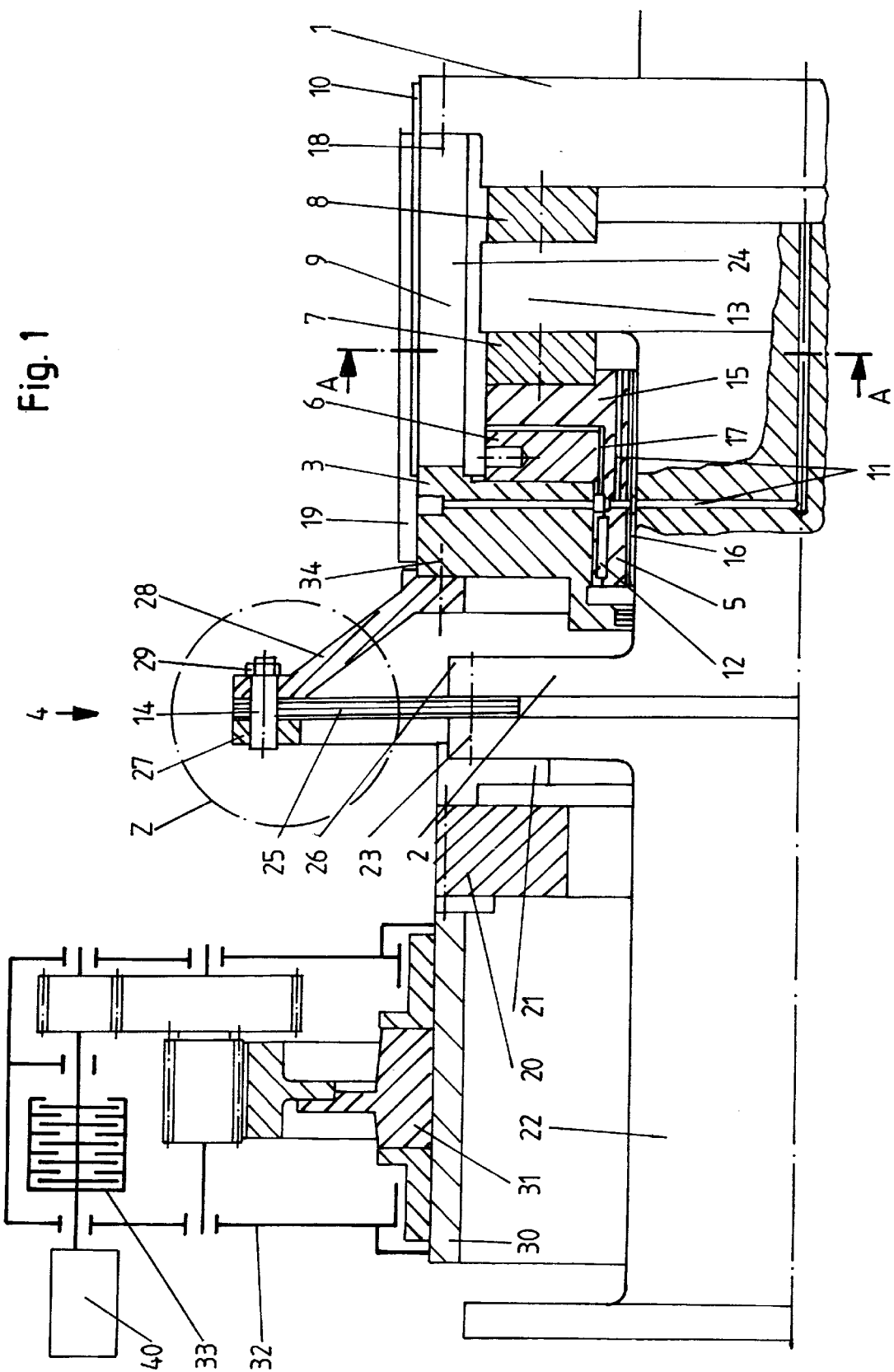
FIG. 1 shows a half-side longitudinal section through a ship drive, in the switched-in state, constructed in accordance with the invention

The drive engine, which is not illustrated in FIG. 1, usually a slow-running Diesel engine, is connected by way of a flange 1 at the drive side and by a diaphragm coupling 4, which is arranged in accordance with the invention, with a propeller intermediate shaft 22. The connection of the propeller intermediate shaft 22 with the actual propeller shaft indusive of the propeller attached thereto is not illustrated here. It is only essential that here there is concerned a so-called direct drive, in which the setting of the desired propeller rotational speed is effected by way of a regulation of the rotational speed of the drive engine. The arrangement of a transmission between drive engine and propeller is not necessary here. So that the ship still remains manoeuvrable even in the case of breakdown of the drive engine, a supplementary drive is provided. This consists of an electric engine 40, which is to be operated selectably as a motor or a generator and which is connected with a transmission 32 by way of a clutch 33. In this example of embodiment the transmission 32 is constructed as a two-stage input transmission and the main gearwheel 31 is fastened to a hollow shaft 30, which engages around the propeller intermediate shaft 22. The connection of the transmission 32 with the propeller intermediate shaft 22 is effected by way of a highly elastic coupling 20, which is connected with the propeller intermediate shaft 22 by means of an annular divided flange 21. For that purpose, the propeller intermediate shaft 22 similarly has a flange 23.

Figure 2:
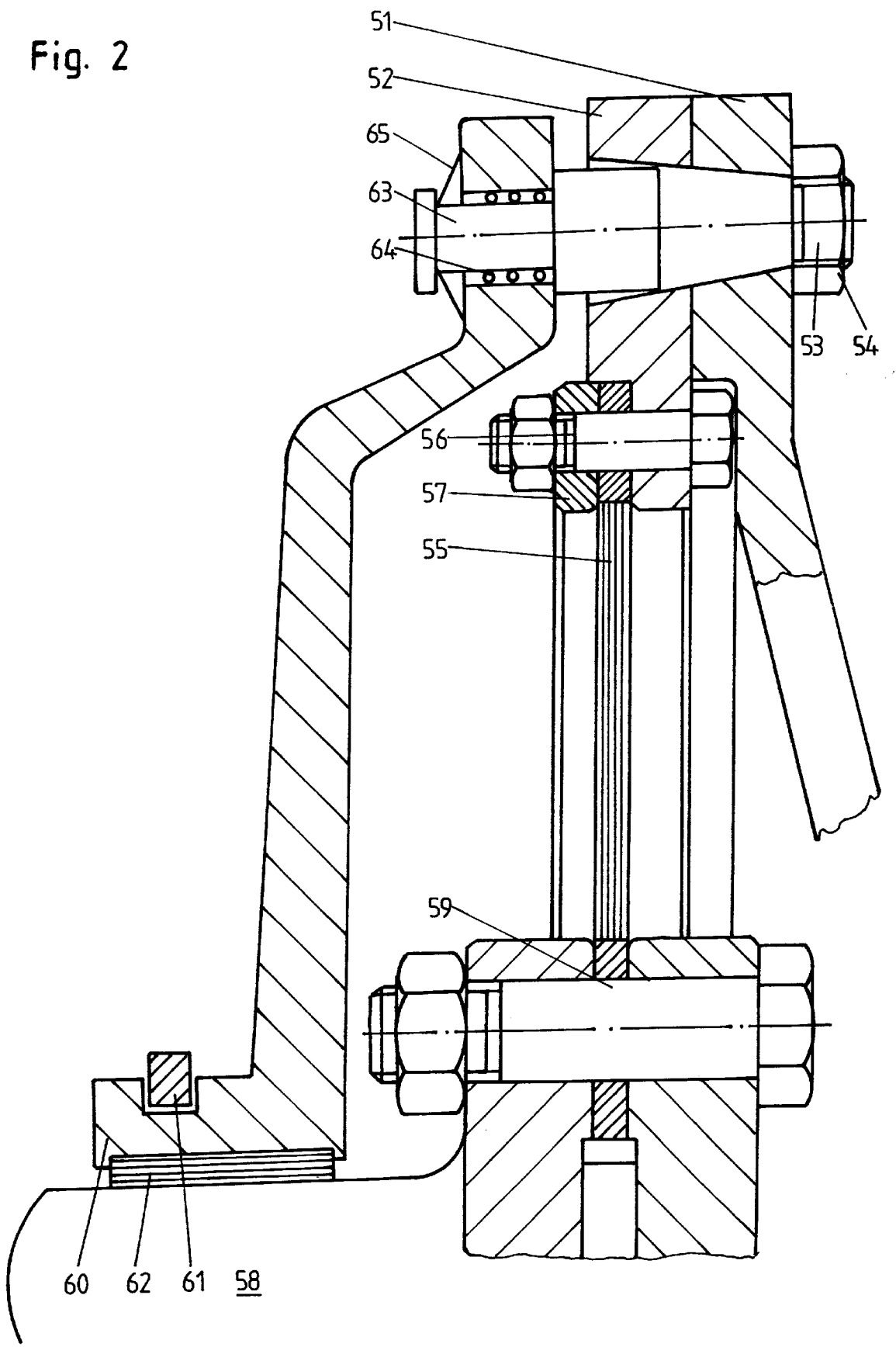
FIG. 2 shows the detail Z in FIG. 1 in enlarged scale.

The transmission of the propeller thrust to a thrust bearing (not illustrated here) arranged in the drive engine is effected by way of forward pressure blocks 8 and reverse pressure blocks 7. The forward pressure blocks 8 are fastened to an end face, which is opposite the flange 1 at the drive side, of the flange 13 of a thrust shaft 2. The reverse pressure blocks 7 are fastened to an end face, which faces the flange 13 of the thrust shaft 2, of a flange 15 of a receiving collar 5. The receiving collar 5 is arranged to be axially displaceable on a slide bearing 16 fastened on the thrust shaft 2. The receiving collar 5 is provided on the cylindrical part with a threaded section 17. A threaded ring 6 is rotatably arranged on this. The threaded ring 6 is supported by an end face, which faces the drive side, against the inner surface of a support collar 3 formed in bell shape. The support collar 3 is fixedly connected with the flange 1 at the drive side by screws 18. The axial displacement of the receiving collar 5 is effected by way of an adjusting spring 12, which is laid into a recess of the cylindrical part of the receiving collar 5 and engages in an axially extending groove of the support collar 3. The support collar 3 is journalled on the thrust shaft 2 by way of the cylindrical part of the receiving collar 5 and by way of the slide bearing 16. As FIG. 2 shows, the support collar 3 consists of two ring halves, which are connected together by way of a parting joint screw connection 19. The lubrication of the pressure blocks 7, 8 is effected by way of channels 11 which are arranged in the support collar 3, the receiving collar 5 and the thrust shaft 2 and which open into intermediate spaces in which the pressure blocks 7, 8 are arranged.

In normal operation the pressure blocks 7, 8 are clamped against the flanges 1, 13 by rotation of the threaded ring 6, so that the propeller thrust is introduced by way of this connection into the already-mentioned thrust bearing arranged in the drive engine. The diaphragm coupling 4, which is formed to be rotationally stiff, but axially yielding, takes over the torque transmission. In this example of embodiment the diaphragm coupling 4 consists of a highly elastic disc 25, which is clamped between the flange 23 of the propeller intermediate shaft 22 on the one hand and the flange 26 of the thrust shaft 2 on the other hand. The disc 25 is covered on the side remote from the main drive by a support ring 27 and on the other side by a flange 28 constructed in cover shape. The connection between support ring 27, disc 25 and flange 28 is effected by way of cone screw bolts 14, which are secured by nuts 29. The required connection of the diaphragm coupling 4 with the auxiliary thrust bearing takes place by way of screws 34, which connect the flange 28 of the diaphragm coupling 4 with the support body 3.

For the emergency operation, the supplementary drive described in the introduction is activated and the electric motor 40 drives the transmission 32 by way of the switched-in clutch 33, and the propeller intermediate shaft 22 by way of the resilient coupling 20. As this supplementary drive has a substantially lower power than the drive engine, the propeller thrust is also correspondingly reduced. Nevertheless, however, this must be absorbed. This happens in the manner that by means of an opening 9, which is let into the circumferential region of the support collar 3, the clamping action is released, in that the threaded ring 6 is rotated oppositely. The protective cover 10 over the opening 9 has to be removed beforehand. Moreover, after loosening of the nuts 29, the cone screw bolts 14 of the diaphragm coupling have to be drawn, so that no torque can be transmitted between propeller intermediate shaft 22 and the support collar 3. After elimination of the clamping actions, the pressure blocks 7, 8 have play. In the case of a forward travel in emergency operation the forward pressure blocks 8 come into contact with the stationary flange 1 at the drive side and statically transmit the reduced propeller thrust. The thus arising friction heat must be conducted way. According to the respective power to be transmitted, a filling up of the auxiliary thrust bearing is sufficient or a pressure lubrication is required by way of the already-mentioned channels 11. In the case of a reverse travel in emergency operation, the flange 13 of the thrust shaft 2 comes into contact with the reverse pressure blocks 7 and the reduced propeller thrust is conducted by way of the stationary receiving collar 5, threaded ring 6, support collar 3 and the flange 1 connected therewith on the drive side into the thrust bearing arranged in the drive engine.

The detail Z of FIG. 1 is illustrated in enlarged scale in FIG. 2 in another form of embodiment. In the illustrated form of embodiment a flange 51 stands in engagement with a counter-flange 52 by way of a cone pin 53 with a locknut 54. A diaphragm packet 55 of the diaphragm coupling is firmly screw-connected with the counter-ring 57 by way of a screw connection 56. The diaphragm packet 55 is connected with a shaft 58 by way of an inner screw connection 59.

In the example of embodiment the torque from the counter-flange 52 is conducted to the diaphragm packet 55 with the aid of the screw-connection 56 with the counter-ring 57 onto the shaft 58 by way of the inner screw connection 59. In that case a predetermined number of cone pins 53 in the flange holes of the flange 51 and the counter-flange 52 ensures the transmission of the requisite torque.

For quick switching-in and switching-out of the coupling it is required that the pins 53 are removed. A guide device consisting of a guide flange 60, a known switching fork 61, abutment pins 63, O rings 64 and plate springs 65 is arranged for that purpose. With the aid of the guide device, the cone pins 53 are drawn after release of the nuts 54, wherein the pins are radially and axially guided in the guide flange 60. In that case the guide flange 60, which stands in engagement with the known switching fork 61, is axially moved on the guide bearing 62 with the aid of this switching fork. The cone pins 53 are guided by way of the abutment pins 63, which are screwed into the cone pins 53. In another form of embodiment the abutment pins 63 can also be welded to the pins 53. The abutment pins 63 are in turn mounted in flange holes of the guide flange 60 by way of O rings 64.

The O rings 64 permit, as radially pliant guidance, the exact setting of the cone pins 53. In that case the plate springs 65, after release of the nuts 54, assist the release procedure of the cone pins 53 out of their guides in the flange holes of the flanges 51 and 52.

What is claimed is:

1. A ship drive comprising: a propeller shaft connected directly to a drive engine; a propeller on said propeller shaft; a thrust bearing for taking up thrust on said propeller; an auxiliary drive having an electrical engine operating selectively as a generator or motor and connected to a transmission through a clutch; a propeller intermediate shaft; said transmission having a gearwheel surrounding said intermediate propeller shaft; a flexible coupling connecting said gearwheel to said intermediate propeller shaft to form a play-free releasable and mechanically positive connection between said transmission and the drive engine; a flange on a thrust shaft at a drive side of the engine and combined with an auxiliary thrust bearing; forward and reverse pressure blocks on said thrust bearing, said thrust bearing being activatable for auxiliary or emergency ship operation; a thrust bearing in said drive engine, said auxiliary thrust bearing introducing correspondingly reduced propeller thrust to said thrust bearing and into a ship's hull; a rotationally stiff and axially pliant diaphragm coupling connected to said propeller shaft and said auxiliary thrust bearing to form said play-free mechanically positive connection; said pressure blocks clamping said auxiliary thrust bearing against said flange on said drive side and said thrust shaft in normal operation; said diaphragm coupling having flanges with flange holes; cone pins in said flange holes; guide means mounted for releasing said cone pins, said cone pins after release of nuts being journalled to be radially and axially movable in said guide means.

2. A ship drive as defined in claim 1, wherein said guide means comprises a guide flange; a switching fork in said guide flange; a guide bearing at said guide flange; abutment pins in said guide flange; O-rings surrounding said abutment pins; plate springs in contact with said guide flange and said abutment pins, said abutment pins being mounted at said cone pins and being journalled by said O-rings in flange holes in said guide flange.

3. A ship drive as defined in claim 2, wherein said abutment pins are screwed into said cone pins.

4. A ship drive as defined in claim 2, wherein said abutment pins are welded to said cone pins.

5. A ship drive as defined in claim 2, wherein said guide flange is axially movable on said guide bearing, said guide flange engaging said switching fork.

6. A ship drive as defined in claim 1, wherein said cone pins have a conicity lying beyond a self-locking limit.

7. A ship drive as defined in claim 1, wherein said guide means is in non-interchangeable engagement with said flange holes.

8. A ship drive as defined in claim 1, wherein said diaphragm coupling has a diaphragm packet; a counter-ring and screw connection, said diaphragm packet being firmly screw-connected with said counter-ring through said screw connection, said diaphragm packet being connected through said screw connection when said diaphragm coupling is switched out.

* * * * *